United States Patent
Kuehnle et al.

(10) Patent No.: US 6,355,907 B1
(45) Date of Patent: Mar. 12, 2002

(54) OPTICAL DEVICE FOR BORING USING A LASER BEAM

(75) Inventors: Goetz Kuehnle, Hemmingen; Norbert Streibl, Leonberg, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,106

(22) PCT Filed: Sep. 7, 1998

(86) PCT No.: PCT/DE98/02639

§ 371 Date: May 8, 2000

§ 102(e) Date: May 8, 2000

(87) PCT Pub. No.: WO99/14010

PCT Pub. Date: Mar. 25, 1999

(30) Foreign Application Priority Data

Sep. 18, 1997 (DE) .......................................... 197 41 029

(51) Int. Cl.[7] ............................................... B23K 26/38
(52) U.S. Cl. ................................................... 219/121.7
(58) Field of Search ........................ 219/121.67, 121.7, 219/121.71, 121.79

(56) References Cited

U.S. PATENT DOCUMENTS

| | | | | |
|---|---|---|---|---|
| 5,365,288 A | * | 11/1994 | Dewald et al. | ................ 353/98 |
| 5,632,083 A | * | 5/1997 | Tada et al. | ..................... 29/827 |
| 5,662,822 A | * | 9/1997 | Tada et al. | ............. 219/121.67 |

FOREIGN PATENT DOCUMENTS

| | | |
|---|---|---|
| JP | 06 320296 | 11/1994 |
| WO | WO 80 01419 | 7/1980 |

* cited by examiner

*Primary Examiner*—Samuel M. Heinrich
(74) *Attorney, Agent, or Firm*—Kenyon & Kenyon

(57) ABSTRACT

An optical drilling device using a laser beam (5), having an optical arrangement located in the beam path for guiding the laser beam (5) along a circular cutting path and a focusing lens system (6) located downstream from the arrangement and focusing the laser beam (5) onto a workpiece (7). Maintaining a simple design, the various parameters can be easily set by providing the optical arrangement with a separately rotatable image rotator (4) which guides the beam along the cutting path.

1 Claim, 1 Drawing Sheet

OPTICAL DEVICE FOR BORING USING A LASER BEAM

BACKGROUND INFORMATION

Figure 1:
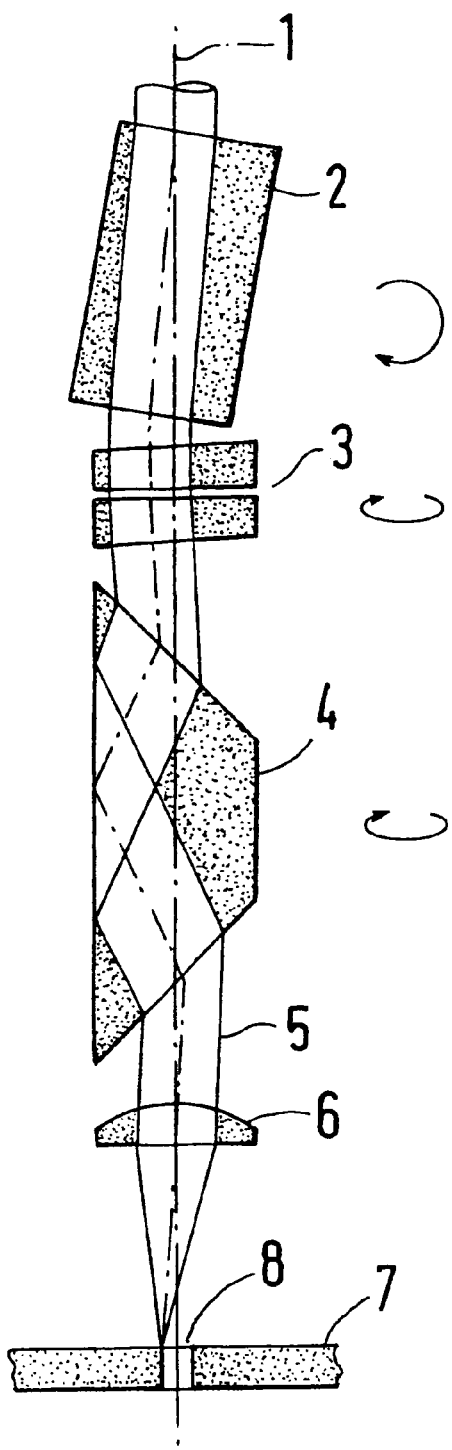

The present invention relates to an optical drilling device using a laser beam, having an optical arrangement located in the beam path for guiding the laser beam along a circular cutting path, as well as a focusing lens positioned downstream from the arrangement which focuses the laser beam onto a workpiece.

In a known optical device of this type, a laser beam, used for example to drill spray holes in injection nozzles, is guided along a circular path having a desired radius, known as the trepanning radius, which largely corresponds to the desired drill hole radius. Changing the direction of the main beam makes it possible to vary the angle of incidence of the laser tool and thus the conical shape of the drill hole.

A variety of devices have been proposed for setting the desired trepanning radius and the angle of incidence. In one known device, an eccentrically rotating focusing lens is provided. In this case, the angle of incidence cannot be varied separately. Mechanical unbalance as well as the need to set parameters in the rotating system also present difficulties A device having an eccentrically rotating focusing lens and a tiltable plane-parallel plate is also known in which the angle of incidence can be additionally influenced by tilting. The mechanism that must also be moved is complex, and mapping errors are difficult to avoid.

A further device of this type has a rotating, tilted plane-parallel plate as well as an adjustable wedge plate positioned upstream from a stationary or rotating focusing lens. In this case as well, the parameters need to be set in the rotating system, and the mechanism is complex and subject to imbalance.

The object of the present invention is to provide an optical device of the type mentioned in the preamble which offers simplified and highly accurate setting capabilities as well as a simple design.

This object is achieved with the features of claim 1. According to these features, the optical arrangement includes a separately rotatable image rotator that is used to guide the beam along the cutting path.

According to these features, separate functions are provided for guiding the beam along the cutting path, setting the trepanning radius and angle of incidence, and focusing the beam so that these settings can be made without difficulty. This also yields a simple drive mechanism in which imbalance can be easily avoided.

According to one advantageous design of the device, the optical arrangement has a shifting element and/or a tilting element, and the image rotator is designed as a prism, mirror or anamorphote device. The shifting element and tilting element can be used to easily adjust the angle of incidence and trepanning radius, respectively. The construction can also be easily implemented by designing the shifting element as a tiltable, plane-parallel plate, designing the tilting element as an adjustable wedge plate, tilting mirror or adjustable lens, and designing the image rotator as a Dove prism or Abbe-König prism.

Focusing spots can be minimized by connecting a telescope upstream from the focusing lens system to expand the beam.

The design is further improved by arranging the shifting element, tilting element, and image rotator consecutively in the beam direction.

Maintaining a simple design, automatic focusing can be achieved by providing an autofocus mechanism in which the image rotator is used as an image derotator in a back-reflected beam, and the shifting and tilting motions achieved by the shifting element and tilting element, respectively, are reversed. To avoid extraction losses, focusing can take place on a different wavelength.

A further important advantage of the features according to the present invention is the improved roundness of the drill holes. The cutting beam produced by the laser frequently does not have a perfect rotational symmetry in its intensity distribution, e.g., due to optical aberrations or the oscillations stimulated in multiple laser modes. In trepanning lens systems without an image rotator, the orientation of the focus asymmetry changes during trepanning relative to the cutting direction. This can lead to roundness irregularities in the drilling result. The image rotator, on the other hand, causes the asymmetrical focus to also rotate during cutting, thus improving roundness.

Figure 2:
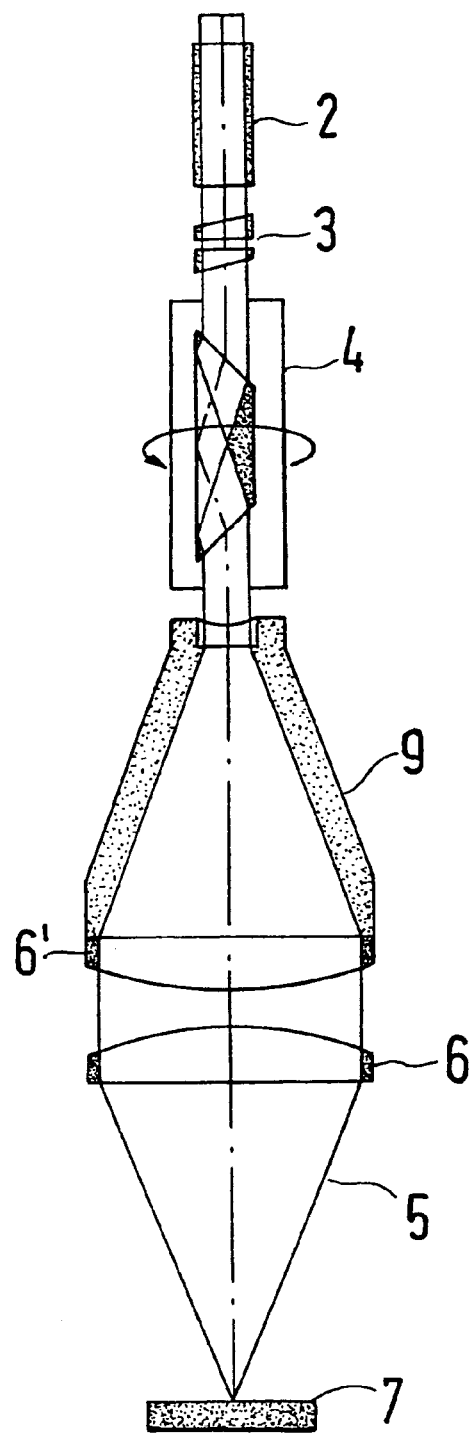

The present invention is explained in greater detail below on the basis of embodiments illustrated in the drawing, where:

FIG. 1 shows an schematic representation of an optical drilling device, in side view, using a laser beam; and FIG. 2 shows another embodiment of the optical device, in side view, with a telescope provided for expanding the beam.

According to the drilling device using a laser beam illustrated in FIG. 1, a collimated laser beam 5 emitted by a laser (not illustrated) is incident upon a shifting element 2 in the form of a plane-parallel plate in the region of a rotary axis 1. Plate 2, which can be, for example cylindrical and plane-parallel in shape, is tilted relative to incident laser beam 5, shifting the latter in a parallel direction onto a downstream tilting element 3 that is composed of two wedge plates that can rotate relative to one another around the optical axis, i.e., rotary axis 1. Rotating one wedge plate relative to the other makes it possible to incline laser beam 5 relative to the main axis, as shown in FIG. 1, causing the beam to subsequently fall onto the sloping incident side of an image rotator in the form of a Dove prism 4 that is held in a bracket (not illustrated) and is positioned so that it can rotate around rotary axis 1. Tilted laser beam 5 emerging from image rotator 4 falls upon a focusing lens system 6 in the form of one or more lenses and is focused by the latter onto a workpiece 7 at the edge of the hole to be cut in the form of trepanning hole 8.

In the embodiment illustrated in FIG. 2, focusing lens system 6' is designed in the form of a multi-element optical system. According to one advantageous feature of this system, a device in the form of a telescope 9 is provided for expanding laser beam 5, making it possible to improve the focus of laser beam 5 on workpiece 7 and to adjust the beam diameter to lens 6. The design is otherwise identical to the one illustrated in FIG. 1.

According to the illustrated design, the functions for focusing the beam, guiding the beam along a circular cutting path, shifting the beam to adjust the angle of incidence, and tilting the beam to adjust the trepanning radius can be set separately, with the functions being performed by individual optical modules. The desired parameters can be set outside the rotating system, making the arrangement easier to use and providing more accurate adjustment. In particular, image rotator 6 alone guides the laser beam in the trepanning motion, which also simplifies the mechanical design of the drive.

With focusing lens 6 having focal distance f, incident collimated laser beam 5 focuses partial beams on a point on the focal plane that is located on or near the surface of workpiece 7. Rotating incident collimated laser beam 5 by a small angle relative to the optical axis shifts the focal point within the focal plane by a distance corresponding to the trepanning radius relative to the optical axis. If laser beam 5 falling upon focusing lens 6 is shifted some distance in a parallel direction relative to the optical axis, the angle of incidence on the workpiece deviates from the normal. Shifting laser beam 5 upstream from focusing lens 6 thus tilts laser beam 5 downstream from focusing lens 6 and makes it possible to change the angle of incidence. To do this, the aperture of focusing lens 6 must be sufficiently large. Tilting laser beam 5 upstream from focusing lens 6 shifts the focal point and makes it possible to change the trepanning radius. To do this, the field within which focusing lens 6 is sufficiently corrected must be of an adequate size. The adjustable shifting and tilting of laser beam 5 upstream from focusing lens 6 thus make it possible to separately vary the focal position (trepanning radius) and tilt angle of laser beam 5 (angle of incidence) downstream from the lens. A collimated laser beam 5 upstream from focusing lens 6 (i.e., positioning the workpiece on the focal plane of focusing lens 8) is advantageous because it eliminates the need to make adjustments to prism systems upstream from focusing lens 6 to correct mapping errors. Other (non-collimated) arrangements are, of course, also conceivable.

Image rotator 4 reflects incident laser beam 5 onto an imaginary plane in the prism which contains rotary axis 1 and is oriented parallel to the base surface. By rotating prism 4 and keeping incident laser beam 5 stationary, an exit point of laser beam 5 rotates around rotary axis 1 on the exit surface of prism 4 at twice the speed of rotation.

If a collimated laser beam 5 that is shifted and tilted, relative to rotary axis 1 is passed through Dove prism 4, the shift and tilt angle also rotate on the exit surface. The arrangement of the image rotator in the form of Dove prism 4 upstream from focusing lens 6 therefore guides laser beam 5 along the trepanning circle with the angle of incidence suitably rotating along with it. A prism system in the collimated laser beam does not introduce any additional mapping errors.

Alternative embodiments of image rotator 4 include a simple combination of mirrors with an odd number of reflections, more complex prism systems, preferably in a direct-vision arrangement (e.g., with three reflections), anamorphote mapping systems/telescopes (implementing a reflection through mapping scales having opposite signs, e.g., +1 and −1, respectively, in the x and y directions, respectively).

To set the angle of incidence, a parallel shifting of collimated laser beam 5 is performed upstream from focusing lens 6 and image rotator 4 by shifting element 2, which, in its simplest form, is designed as a plane-parallel plate. The beam is not shifted when a normal incident light strikes plate 2. To create small tilting angles of the plate, the beam is shifted in proportion to the tilting angle and plate thickness. A more complex trigonometric relationship results in the case of large angles. With a suitable design, it is possible to achieve an "optical transformation", allowing the shifting motion to be very accurately set by providing a comparatively rough tilting angle variation. Alternatives to a plane-parallel plate include synchronously tiltable mirrors, a telescope with lenses that can move relative to one another, and similar arrangements.

Tilting the beam to set the trepanning radius can be easily accomplished with tilting element 3 by means of a relative rotation of the wedge plates. This makes it possible to achieve an optical transformation. According to an alternative embodiment, tilting element 3 can be, for example, a tilting mirror.

To adjust the focus automatically, an autofocus mechanism can be provided which requires monitoring of the device focus, and a different wave length can be selected to avoid extraction losses. The light reflected back from workpiece 7 is extracted after reversing the image rotation, shifting motion, and tilting motion by reversing the beam path. Methods for detecting the focusing quality are known from the related art. Image rotator 4 is used as an image derotator.

With the described features, it is possible, in particular, to decouple the trepanning movement from other setting parameters, thus improving the setting capabilities and simplifying the design.

What is claimed is:

1. An optical drilling device using a laser beam (5), having an optical arrangement, which is located in the beam path and includes a separately rotatable image rotator (4), for guiding the laser beam (5) along a circular cutting path; and having a focusing lens system (6) positioned downstream from the arrangement and focusing the laser beam (5) onto a workpiece (7); characterized in that the laser beam is guided along the cutting path solely by the image rotator (4).

* * * * *